US010484840B2

(12) United States Patent
Huang et al.

(10) Patent No.: US 10,484,840 B2
(45) Date of Patent: Nov. 19, 2019

(54) METHOD AND SYSTEM FOR GROUPING COMMUNICATIONS BETWEEN MOBILE COMMUNICATION DEVICES

(71) Applicant: MOTOROLA SOLUTIONS, INC., Chicago, IL (US)

(72) Inventors: Yong Huang, Sichuan (CN); Quan-Wen Du, Sichuan (CN); Jun-Lin Li, Sichuan (CN); Nan-E Li, Sichuan (CN); Guochao Yin, Sichuan (CN); Meng-Tao Zhu, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/063,854

(22) PCT Filed: Jan. 20, 2016

(86) PCT No.: PCT/CN2016/071503
§ 371 (c)(1),
(2) Date: Jun. 19, 2018

(87) PCT Pub. No.: WO2017/124337
PCT Pub. Date: Jul. 27, 2017

(65) Prior Publication Data
US 2018/0376295 A1 Dec. 27, 2018

(51) Int. Cl.
*H04W 4/08* (2009.01)
*H04W 4/06* (2009.01)

(52) U.S. Cl.
CPC .............. *H04W 4/08* (2013.01); *H04W 4/06* (2013.01)

(58) Field of Classification Search
CPC ..................................................... H04W 4/08
(Continued)

(56) References Cited

U.S. PATENT DOCUMENTS 7,606,938 B2 * 10/2009 Roese ........................ G01S 5/02
709/242
8,634,797 B2 * 1/2014 McEwen ................. H04W 4/90
455/404.1
(Continued)

FOREIGN PATENT DOCUMENTS

| CN | 101345911 | 1/2009 |
| CN | 102665186 | 9/2012 |

OTHER PUBLICATIONS

PCT/CN2016/071503 International Search Report and Written Opinion of the International Searching Authority dated Oct. 9, 2016 (11 pages).

*Primary Examiner* — Tan H Trinh
(74) *Attorney, Agent, or Firm* — Michael Best & Friedrich LLP

(57) ABSTRACT

A method and apparatus for grouping communications between mobile communication devices. The method includes receiving, at a mobile communication device, one or more facility identifiers, each of the one or more facility identifiers associated with a facility. The method further includes storing the one or more facility identifiers in a memory; decoding, via an electronic processor, a group call having an initiation identifier; and comparing, via the electronic processor, the initiation identifier to the one or more facility identifiers. The method further includes joining, via the electronic processor, the group call based on the comparison between the initiation identifier and the one or more facility identifiers. The method may further include leaving, via the electronic processor, the group call.

20 Claims, 4 Drawing Sheets

(58) Field of Classification Search
USPC ... 455/518, 519, 414.1, 404.2, 456.1, 456.6, 455/456.5, 404.1, 418, 426.1; 709/203
See application file for complete search history.

(56) References Cited

U.S. PATENT DOCUMENTS

| | | | | |
|---|---|---|---|---|
| 9,473,901 | B1* | 10/2016 | White | H04W 4/043 |
| 9,781,574 | B2 | 10/2017 | Wawrowski et al. | |
| 2002/0116233 | A1* | 8/2002 | Kuge | G06Q 10/02 |
| | | | | 705/5 |
| 2002/0151321 | A1* | 10/2002 | Winchell | G06Q 30/02 |
| | | | | 455/519 |
| 2005/0014490 | A1* | 1/2005 | Desai | H04L 51/24 |
| | | | | 455/416 |
| 2006/0148467 | A1* | 7/2006 | Kreitzer | H04W 8/22 |
| | | | | 455/426.1 |
| 2010/0234057 | A1* | 9/2010 | Drozt | H04L 63/0407 |
| | | | | 455/518 |
| 2011/0117878 | A1* | 5/2011 | Barash | H04W 4/90 |
| | | | | 455/404.2 |
| 2011/0161399 | A1* | 6/2011 | Agulnik | H04M 3/4935 |
| | | | | 709/203 |
| 2012/0078505 | A1* | 3/2012 | Nakamura | G01C 21/3673 |
| | | | | 701/411 |
| 2012/0135718 | A1* | 5/2012 | Amidon | H04M 3/42374 |
| | | | | 455/414.1 |
| 2013/0095801 | A1* | 4/2013 | Kermoian | H04M 1/72597 |
| | | | | 455/414.1 |
| 2013/0288719 | A1* | 10/2013 | Alonzo | H04W 4/043 |
| | | | | 455/457 |
| 2014/0129626 | A1* | 5/2014 | Smadi | H04W 4/08 |
| | | | | 709/204 |
| 2014/0243034 | A1 | 8/2014 | Gurney et al. | |
| 2014/0270114 | A1* | 9/2014 | Kolbegger | G10L 25/93 |
| | | | | 379/88.08 |
| 2015/0100302 | A1* | 4/2015 | Flaks | G10L 15/1822 |
| | | | | 704/9 |
| 2015/0195406 | A1* | 7/2015 | Dwyer | H04M 3/5175 |
| | | | | 379/265.07 |
| 2016/0212695 | A1* | 7/2016 | Lynch | H04W 48/08 |
| 2017/0230799 | A1* | 8/2017 | Wawrowski | H04W 4/029 |
| 2017/0294131 | A1* | 10/2017 | Jedrzejewski | H04W 4/08 |

* cited by examiner

METHOD AND SYSTEM FOR GROUPING COMMUNICATIONS BETWEEN MOBILE COMMUNICATION DEVICES

BACKGROUND OF THE INVENTION

Wireless communication networks support communications between mobile communication devices. Such mobile communication devices are often referred to as subscriber units (SUs) and, in some cases, portable subscriber units (PSUs) or mobile subscriber units (MSUs). In some wireless communication networks, for example, land mobile radio (LMR) and trunked radio networks, the subscriber units can communicate with each other in talk groups. A talk group is a group of subscriber units, created by an administrator, in which each subscriber unit in the talk group may participate in a group call. Group calls may be initiated and managed, for example, at a call controller, a call center, a control head, or a server.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
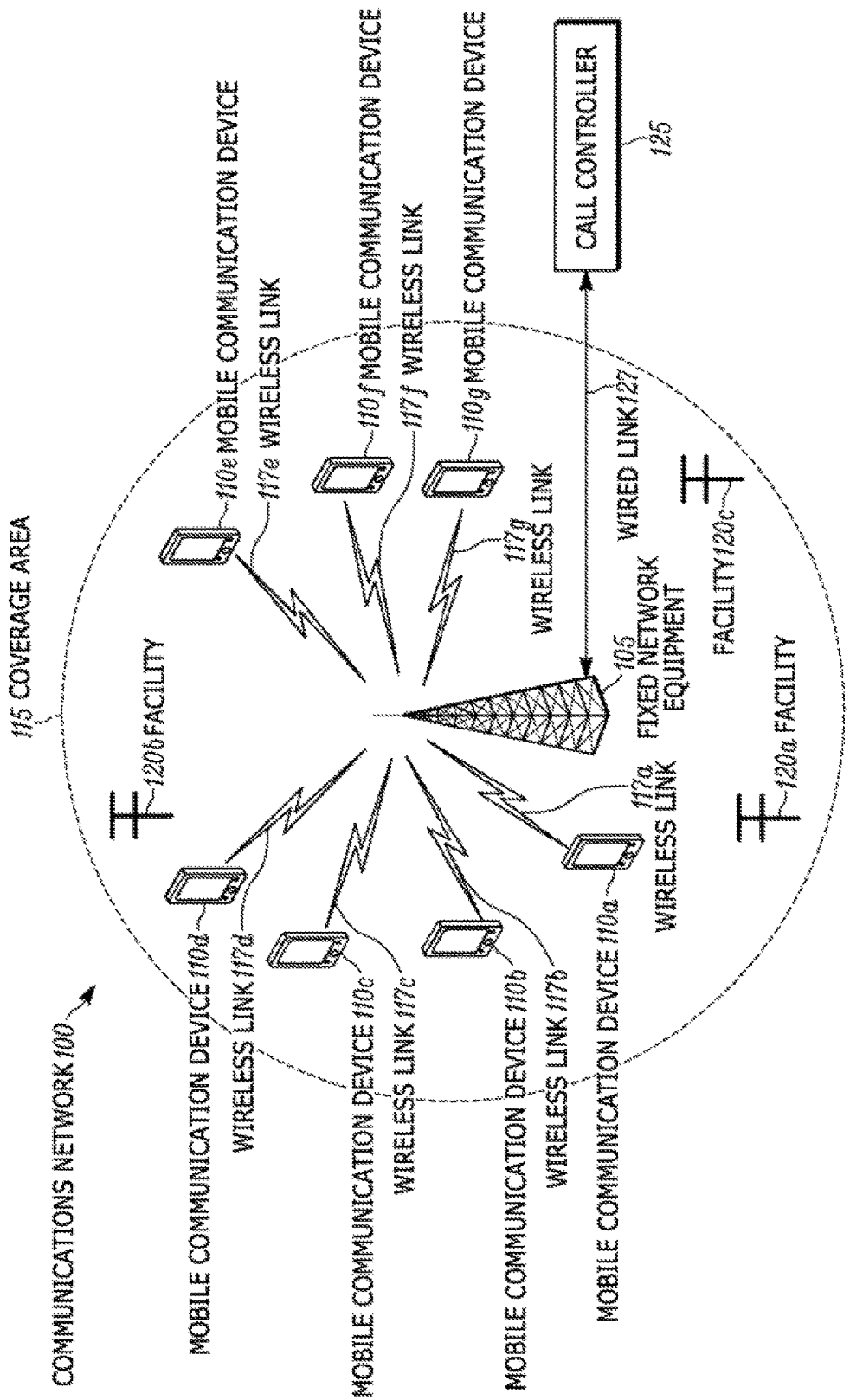
FIG. 1 is a block diagram of a communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of grouping communications between mobile communication devices. In one instance, the method includes receiving, at a mobile communication device, one or more facility identifiers, each of the one or more facility identifiers associated with a facility. The method further includes storing the one or more facility identifiers in a memory; decoding, via an electronic processor, a group call having an initiation identifier; and comparing, via the electronic processor, the initiation identifier to the one or more facility identifiers. The method further includes joining, via the electronic processor, the group call based on the comparison between the initiation identifier and the one or more facility identifiers.

Another embodiment provides, a system for grouping communications between mobile communication devices. In one instance, the system includes an initiator mobile communication device and a secondary mobile communication device. The initiator mobile communication device includes a transceiver and an electronic processor electrically coupled to the transceiver. The electronic processor is configured to initiate a group call having an initiation identifier. The secondary mobile communication device includes a secondary transceiver, a secondary electronic processor electrically coupled to the secondary transceiver, and a secondary memory electrically coupled to the secondary electronic processor. The secondary electronic processor is configured to receive one or more facility identifiers, each of the one or more facility identifiers associated with a facility, write the one or more facility identifiers to the secondary memory, decode the group call to determine the initiation identifier, compare the initiation identifier to the one or more facility identifiers, and join the group call based on the comparison between the initiation identifier and the one or more facility identifiers.

Yet another embodiment provides, a mobile communication device including a transceiver, a memory, and an electronic processor electrically coupled to the transceiver and the memory. In one instance, the electronic processor is configured to receive one or more facility identifiers, each of the one or more facility identifiers associated with a facility, write the one or more facility identifiers to the memory, decode a group call having an initiation identifier, compare the initiation identifier to the one or more facility identifiers, and join the group call based on the comparison between the initiation identifier and the one or more facility identifiers.

FIG. 1 is a block diagram of a communications network 100 for providing wireless communication. In the example illustrated, the communications network 100 may include fixed network equipment 105, such as a base station. In some embodiments, the communications network 100 includes more than one base station. In other embodiments, rather than one or more base stations, the communications network 100 includes one or more repeaters. In other embodiments, the communication network 100 includes one or more repeaters and one or more base stations.

The mobile communication network 100 may, for example, be implemented in accordance with Project 25 (P 25) or other communications protocols. The fixed network equipment 105 may be communicatively coupled to one or more mobile communication devices 110a through 110g. On a singular basis, one of the mobile communication devices 110a through 110g may be referred to herein as a mobile communication device 110. The mobile communication devices 110a through 110g may be, for example, hand-held radios, vehicle-mounted radios, dispatch radios, or other wireless communication devices compatible with the protocol of the mobile communications network 100. In some embodiments, there may be more or less mobile communication devices communicatively coupled to the fixed network equipment 105 than are illustrated in FIG. 1.

The fixed network equipment 105 has a coverage area 115. The fixed network equipment 105 is communicatively coupled via wireless links 117a through 117g with mobile communication devices 110a through 110g located within the coverage area 115. One or more facilities 120a through 120c may be located within the coverage area 115. In some embodiments, there may be more or less facilities 120a through 120c located within the coverage area 115 than illustrated in FIG. 1. Facilities 120a through 120c may be an outdoor facility, such as but not limited to, utility poles (e.g., power cable poles, light poles, telephone poles), buildings, advertising structures (e.g., billboards), bridges, street lights, street signs, and other infrastructure. In other embodiments, facilities 120a through 120c may be an indoor facility. In yet another embodiment, facilities 120a through 120c may be mobile, such as but not limited to, a vehicle in an incident area. In other embodiments, facilities 120a through 120c may be Each facility 120a through 120c may have a unique facility identification (shown in FIG. 4). On a singular basis, one of the facilities may be referred to herein as a facility 120. In some embodiments, a fixed network equipment 105 may be located at each facility 120.

A call controller 125 (e.g., a trunking controller, a call center computer, a control head, an infrastructure controller, a console, or a server) is communicatively coupled to the plurality of mobile communication devices 110a through 110g via a wired link 127 to the fixed network equipment 105 and the wireless links 117a through 117g. The call controller 125 is configured to manage communication among the plurality of mobile communication devices 110a through 110g. FIG. 1 illustrates one configuration of an embodiment of a communications network, in other embodiments, the communications network may have a different configuration.

Figure 2:
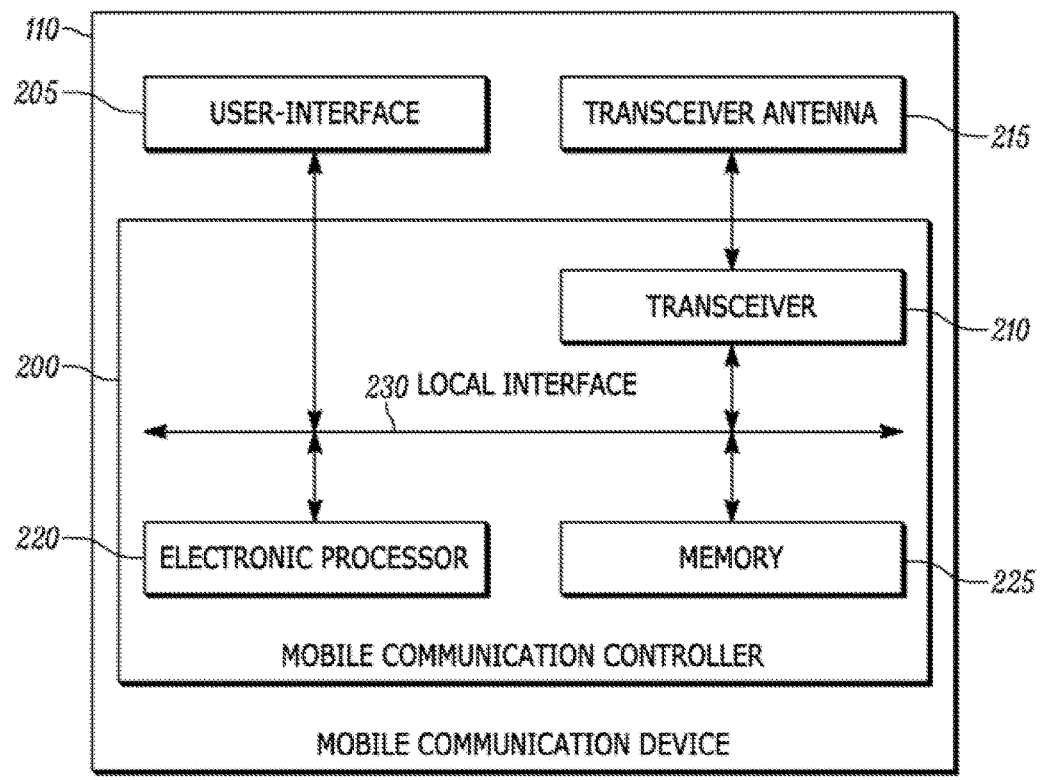
FIG. 2 is a block diagram of a subscriber unit of the communications network of FIG. 1 in accordance with some embodiments.

FIG. 2 is a block diagram of one embodiment of a mobile communication device 110. In the example illustrated, the mobile communication device 110 includes, among other things, a mobile communication controller 200, a user-interface 205, a transceiver 210, and a transceiver antenna 215. The mobile communication controller 200 includes an electronic processor 220 and a memory 225. The mobile communication controller 200 can implement certain methods described herein.

It should be appreciated by those of ordinary skill in the art that FIG. 2 depicts the mobile communication device 110 and mobile communication controller 200 in a simplified manner, and an actual implementation may include suitably configured power components and processing logic to support known or conventional features. The components of the mobile communication device 110 and mobile communication controller 200 may be communicatively coupled to one another via a local interface 230. The local interface 230 may include, for example, one or more buses or other connections.

The electronic processor 220 is a hardware device for executing software instructions. The electronic processor 220 may be a microprocessor or other similar device. The memory 225 includes, for example, a program storage area and a data storage area. The program storage area and the data storage area can include combinations of different types of memory, such as read-only memory (ROM), random access memory (RAM) or other suitable magnetic, optical, physical, or other non-transitory computer readable medium. The electronic processor 220 is connected to the memory 225 and executes software instructions that are capable of being stored in a random access memory (RAM) of the memory 225 (e.g., during execution), a read-only memory (ROM) of the memory 225 (e.g., on a generally permanent basis). The software may include, one or more applications, program data, filters, rules, one or more program modules, and other executable instructions.

The user-interface 205 is communicatively coupled to the mobile communication controller 200 via the local interface 230. The user-interface 205 is used to receive user input and/or provide user output. The user-interface 205 includes a combination of digital and/or analog input and/or output devices, for example, a touch-screen display, knobs, dials, switches, buttons, and speakers.

The transceiver 210, along with the transceiver antenna 215, enables wireless communication from the mobile communication device 110 to, for example, the call controller 125 and/or other mobile communication devices, via the fixed network equipment 105 and wireless links 117a through 117g. In other embodiments, rather than a transceiver 210 and transceiver antenna 215, the mobile communication device 110 may include separate transmitting and receiving components, for example, a transmitter, a transmitting antenna, a receiver, and a receiving antenna.

Figure 3:
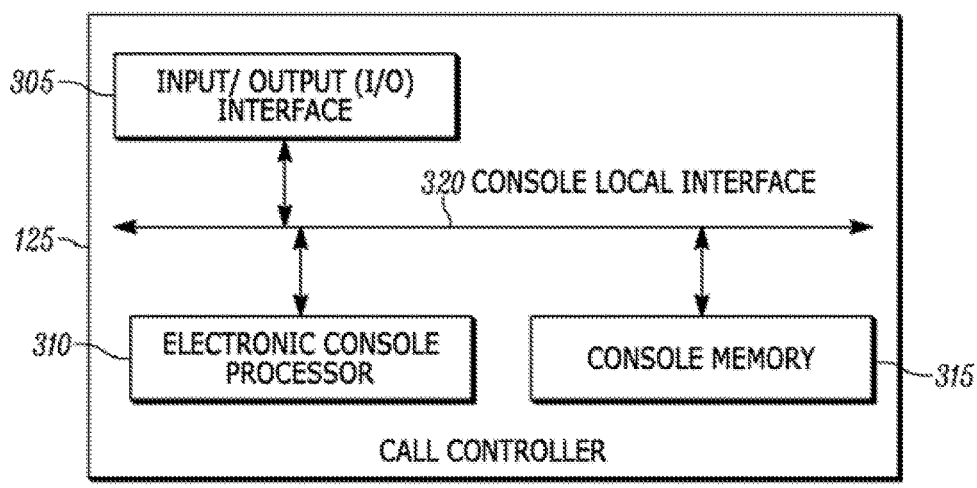
FIG. 3 is a block diagram of a call controller of the communications network of FIG. 1 in accordance with some embodiments.

FIG. 3 is a block diagram of an exemplary call controller 125. The call controller 125 may include, among other things, an input/output (I/O) interface 305, call controller electronic processor 310, and a call controller memory 315.

FIG. 3 depicts the call controller 125 in a simplified manner, and an actual implementation may include additional components to support known or conventional features. The components of the call controller 125 are communicatively coupled to another via a call controller local interface 320. The call controller local interface 320 may be, for example, one or more buses or other wired or wireless connections.

The call controller electronic processor 310 is a hardware device, such as a microprocessor, for executing software instructions. The call controller memory 315 includes, for example, a program storage area and a data storage area. The program storage area and the data storage area can include combinations of different types of memory, such as read-only memory (ROM), random access memory (RAM) or other suitable memory. The call controller electronic processor 310 executes software instructions that are capable of being stored in random access memory (RAM) of the call controller memory 315 (e.g., during execution), read-only memory (ROM) of the call controller memory 315 (e.g., on a generally permanent basis), or another non-transitory computer readable medium. The software may include, one or more applications, program data, filters, rules, one or more program modules, and other executable instructions.

The input/output (I/O) interface 305 may provide wired and/or wireless communication between the call controller 125 and external devices, for example, other mobile communication devices 110, through the fixed network equipment 105 and the wired link 127 and wireless links 117a through 117g.

Figure 4:
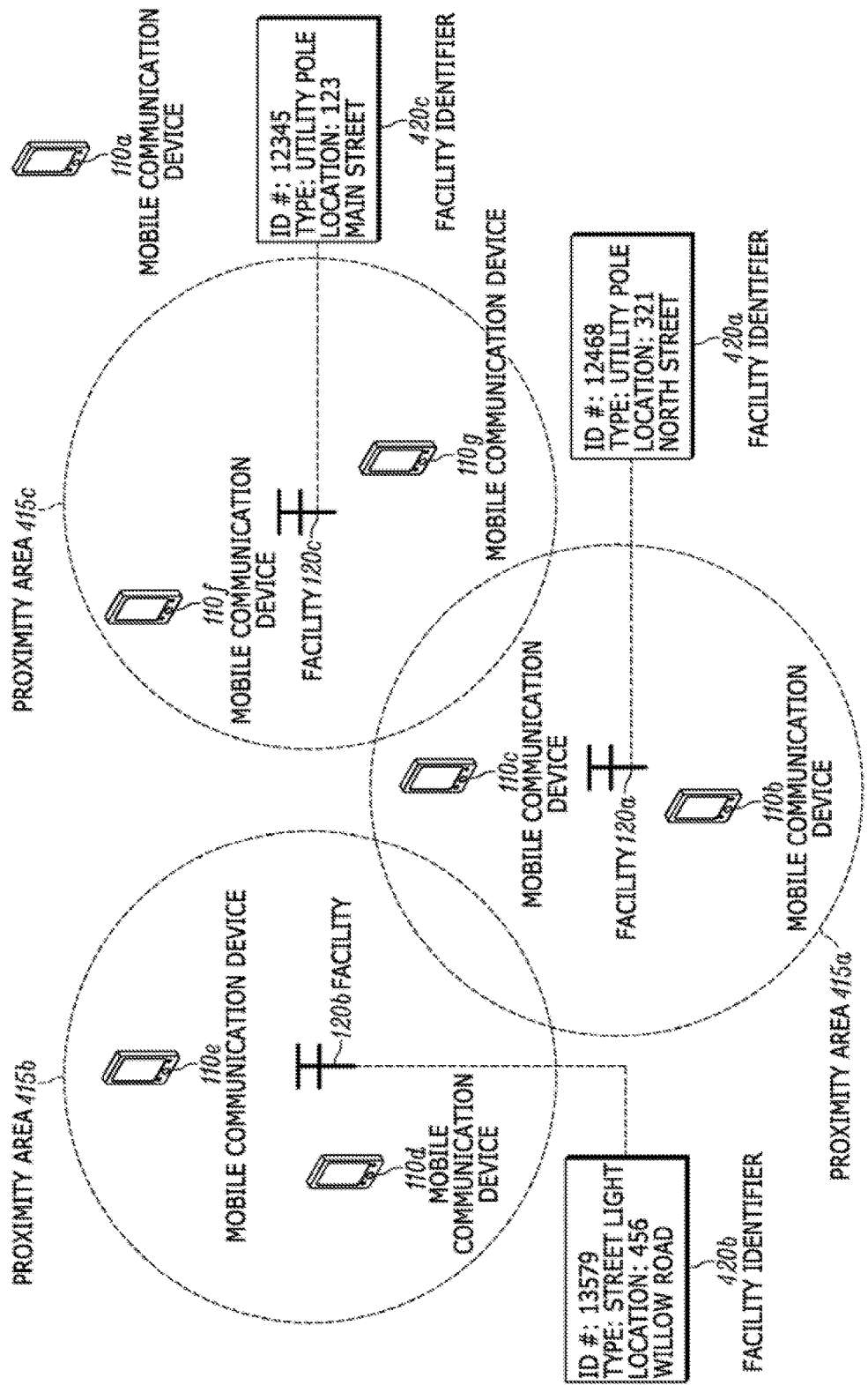
FIG. 4 is a schematic illustration of multiple facilities each having a proximity area and a subscriber unit located within the proximity area of each facility in accordance with some embodiments.

FIG. 4 is a schematic illustration of facilities 120a through 120c and respective proximity areas 415a through 415c. As with other components described herein, on a singular basis, one of the proximity areas may be referred to as a proximity area 415. Facility 120a has a proximity area 415a, facility 120b has a proximity area 415b, and facility 120c has a proximity area 415c. In the embodiment illustrated, mobile communication devices 110b through 110g are located with the proximity areas 415a through 415c, respectively. However, it should be understood that the mobile communication devices 110a through 110g are mobile and may move from one proximity area to another. In addition, a mobile communication device may be in more than one proximity area at a time. In one example, a proximity area may be defined by a predetermined distance, for example, within a 250 meter radius.

As a mobile communication device (mobile communication devices 110a through 110g) enters the proximity area (proximity areas 415a through 415c) of a facility (facilities 120a through 120c), the mobile communication device (mobile communication devices 110a through 110g) receives a facility identifier (facility identifiers 420a through 420c) corresponding to the facility (facilities 120a through 120c). As illustrated, in some embodiments, the facility identifier (facility identifiers 420a through 420c) may include information corresponding to the respective facility (facilities 120a through 120c), including but not limited to, facility identification number, facility type, and facility location. In some embodiments, the information included in the facility identifier 420a through 420c (e.g., facility identification number, facility type, and facility location) may be use a coding protocol. For example, but not limited to, the facility identifier 420a through 420c may include 24-bits. In such an example, the first 8-bits may correspond to the facility type, while the remaining 16-bits correspond to one or more facility identification numbers. In some instances, the one or more of the facilities 120a through 120c transmit their respective facility identifiers 420a through 420c (for example, as a radio frequency beacon using a near-field communication mechanism or a wireless, local area network mechanism), and the proximity area corresponds to a reception area. The mobile communication devices 110a through 110g are configured to automatically receive the facility identifiers 420a through 420c.

In other embodiments, the facility identifiers 420a through 420c may include words, numbers, or graphical symbols printed or otherwise affixed or associated with the facilities. In such cases, the facility identifiers 420a through 420c may be manually entered into the mobile communication devices (mobile communication devices 110a through 110g) using the user-interface 205. In other embodiments, the facility identifiers 420a-420c may be read or scanned, for example, by using an optical scanner to read a bar code or quick response (QR) code or a radio frequency scanner to scan an area for radio frequency facility identifiers 420a through 420c.

In another embodiment, the mobile communication devices (mobile communication devices 110a through 110g) receive the facility identifiers 420a through 420c from the call controller 125. In such an embodiment, the call controller 125 tracks the location (e.g., using the global positioning system (GPS) or similar location tracking system) of the individual mobile communication devices (mobile communication devices 110a through 110g). When a mobile communication device (mobile communication devices 110a through 110g) is within a proximity area (facilities 120a through 120c) of a facility (facilities 120a through 120c), the call controller 125 sends the corresponding facility identifier (facility identifiers 420a through 420c) to the mobile communication device (mobile communication devices 110a through 110g). In yet another embodiment, the mobile communication devices (mobile communication devices 110a through 110g) receive the facility identifiers 420a through 420c from another mobile communication device 110.

Upon receiving a facility identifier 420a through 420c, the mobile communication device 110 stores one or more of the facility identifier 420a through 420c into the memory 225. As a particular mobile communication device 110 encounters multiple proximity areas, multiple facility identifiers 420a through 420 care stored in the memory 225 to create a list or table of facility identifiers 420a through 420c. Individual facility identifiers 420a through 420c stored in the memory 225 may be enabled and disabled based on one or more predefined validation rules. For example, in some embodiments, individual facility identifiers 420a through 420c may be enabled or disabled based on, for example, a distance from the facility 120 or a time since receiving the facility identifier 420a through 420c. In some embodiments, for example, when the mobile communication device 110 leaves a proximity area 415 of a facility 120, the mobile communication device 110 will disable the facility identifier 420a through 420c corresponding to the facility.

In some embodiments, the facility identifier 420a through 420c includes more than identifying information. For example, the facility identifier 420a through 420c may include information related to the number of mobile communication devices that are currently within a proximity area 415 of a corresponding facility 120.

Figure 5:
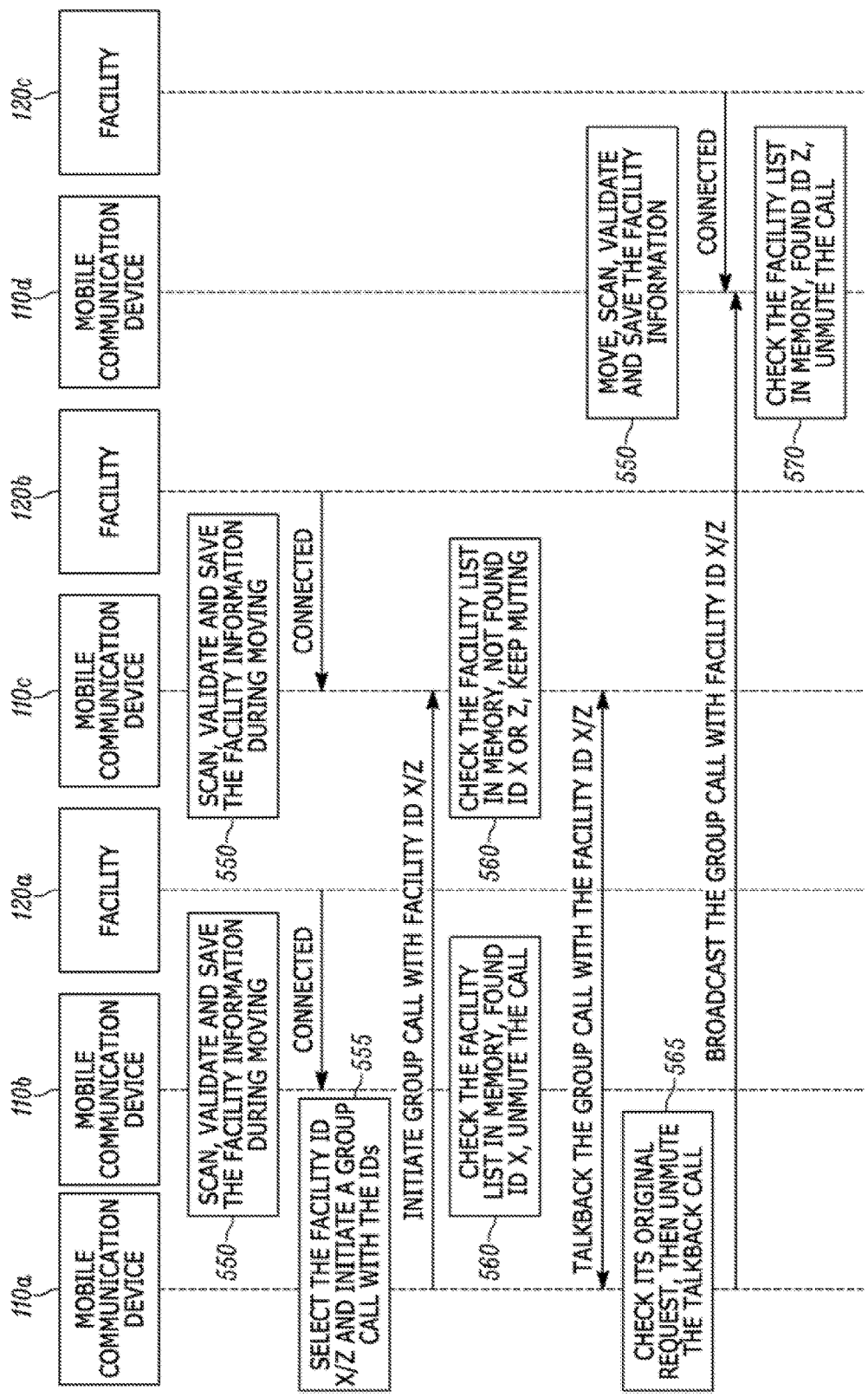
FIG. 5 is an operational flow procedure for managing a communications network in accordance with some embodiments.

FIG. 5 illustrates a method or operational flow procedure 500 for managing communications between a plurality of mobile communication devices (e.g., mobile communication devices 110a through 110d illustrated in FIGS. 1 and 4). Mobile communication devices 110e through 110g may operate in a similar fashion. In the illustrated embodiment, mobile communication device 110a acts as an initiator mobile communication device, while mobile communication devices 110b through 110d act as secondary mobile communication devices.

In operation, as secondary mobile communication devices (mobile communication devices 110b through 110d) come within a predetermined distance of a facility (facilities 120a through 120c), the secondary mobile communication devices (mobile communication devices 110b through 110d) receive the facility identifier (facility identifiers 420a through 420c) corresponding to the facility (facilities 120a, 120b, or 120c) (Block 550). In the illustrated example, mobile communication device 110b receives the facility identifier corresponding to facility 120a, while mobile communication device 110c receives the facility identifier (facility identifiers 420a through 420c) corresponding to facility 120b and mobile communication device 110d receives the facility identifier (facility identifiers 420a through 420c) corresponding to facility 120c.

The initiator mobile communication device (mobile communication device 110a) initiates a group call having an initiation identifier related to one or more facilities (facilities 120a, 120b) (Block 555). The secondary mobile communication devices (mobile communication devices 110b, 110c) receive and decode the initiation identifier and compare the decoded initiation identifier to the one or more facility identifiers (facility identifiers 420a through 420c) stored in the memory (Block 560). If the initiation identifier matches a facility identifier (facility identifiers 420a through 420c) stored in memory of the secondary mobile communication devices (mobile communication devices 110b through 110d), the mobile communication device (mobile communication devices 110b through 110d) joins the group call initiated by the initiator subscriber (mobile communication device 110a). In some embodiments, the mobile communication device (mobile communication devices 110b through 110d) joins the group call in a muted state (e.g., turns off an audio microphone to prevent speech from being delivered to group members, but plays audio conversations of other group members) and then unmutes the call to allow full participation in the group call. In other embodiments, the mobile communication device (mobile communication devices 110b through 110d) joins the group call in an enabled or unmuted state to allow immediate full participation in the group call. In other embodiments, the mobile communication device (mobile communication devices 110b through 110d) joins the group call by enabling communication between the mobile communication device (mobile communication devices 110b through 110d) and other mobile communication devices. If the initiation identifier does not match a facility identifier (facility identifiers 420a through 420c) stored in memory, the secondary mobile communication devices (mobile communication devices 110b through 110d) do not join the group call. In some embodiments, the mobile communication device (mobile communication devices 110b through 110d) does not join the group call by continuing to mute the call. In other embodiments, the mobile communication device (mobile communication devices 110b through 110d) does not join the group call by not enabling communication between the mobile communication device (mobile communication devices 110b through 110d) and other mobile communication devices. When the initiation identifier matches the facility identifiers (facility identifiers 420b, 420c) stored in the memory of mobile communication devices 110b and 110c, the mobile communication devices 110b and 110c joins the group call (Block 560).

The initiator mobile communication device (mobile communication device 110a) once again outputs the initiation identifier (Block 565). In some embodiments, Block 565 is performed so that any mobile communication devices (mobile communication device 110d) that did not receive the initial initiation identifier have an opportunity to join the group call by receiving and comparing the initiation identifier to the facility identifiers (facility identifiers 420a through 420c) stored in memory. Mobile communication device 110d receives the initiation identifier and compares it to the one or more facility identifiers (facility identifier 420c) stored in memory (Block 570). When the initiation identifier does not match the one or more facility identifiers (facility identifier 420c) stored in the memory of mobile communication device 110d, the mobile communication device 110d does not join the group call.

In some embodiments, the secondary mobile communication devices may leave the group call at any time. In some embodiments, the secondary mobile communication devices may leave the group call upon leaving the proximity area of a facility. In some embodiments, the secondary mobile communication devices may leave the group call, by disabling the facility identifier stored in memory, at any time. In such embodiments, the secondary mobile communication devices may leave the group call by muting the group call or disabling communication.

In some embodiments, the secondary mobile communication devices may join the group call upon reaching the corresponding proximity area of a facility. In some embodiments, the secondary mobile communication devices may join the group call by enabling the corresponding facility identifier stored in memory. In such embodiments, the secondary mobile communication devices may join the group call by unmuting the group call or enabling communication.

In some embodiments, the call controller 125 may initiate a group call. In such an embodiments, the call controller 125 outputs the initiation identifier to the mobile communication devices (mobile communication devices 110a through 110g). The mobile communication devices (mobile communication devices 110a through 110g) then receive and decode the initiation identifier and compare the decoded initiation identifier to the one or more facility identifiers (facility identifiers 420a through 420c) stored in the memory. If the initiation identifier matches a facility identifier (facility identifiers 420a through 420c) stored in memory of the secondary mobile communication devices (mobile communication devices 110a through 110g), the mobile communication device (mobile communication devices 110a through 110g) joins the group call initiated by the call controller 125. If the initiation identifier does not match a facility identifier (facility identifiers 420a through 420c) stored in memory, the secondary mobile communication devices (mobile communication devices 110a through 110g) does not join the group call. In such an embodiment, the secondary mobile communication devices (mobile communication devices 110a through 110g) may join, or not join, the group call in any manner described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of grouping communications between mobile communication devices, the method comprising:
    receiving, at a mobile communication device, one or more facility identifiers, each of the one or more facility identifiers associated with a facility;
    storing the one or more facility identifiers in a memory;
    decoding, via an electronic processor, a group call having an initiation identifier;
    comparing, via the electronic processor, the initiation identifier to the one or more facility identifiers; and
    joining, via the electronic processor, the group call based on the comparison between the initiation identifier and the one or more facility identifiers.

2. The method of claim 1, wherein receiving, at a mobile communication device, one or more facility identifiers comprises scanning an area for radio frequency facility identifiers.

3. The method of claim 1, wherein receiving, at a mobile communication device, one or more facility identifiers comprises receiving at least one facility identifier from at least one selected from the group consisting of a call controller, a second mobile communication device, and a facility.

4. The method of claim 1, wherein joining, via the electronic processor, the group call comprises at least one selected from the group consisting of enabling communication and unmuting the group call.

5. The method of claim 1, further comprising disabling one or more of the one or more facility identifiers based on a predefined validation rule.

6. The method of claim 5, wherein disabling one or more of the one or more facility identifiers is based on at least one selected from the group consisting of a predetermined distance and a predetermined time.

7. The method of claim 1, further comprising leaving, via the electronic processor, the group call, wherein the step of leaving, via the electronic processor, the group call includes at least one selected from the group consisting of disabling one or more of the one or more facility identifiers and leaving a proximity area of the facility.

8. A system for grouping communications between mobile communication devices, the system comprising:
    an initiator mobile communication device including a transceiver and an electronic processor electrically coupled to the transceiver, the electronic processor configured to initiate a group call having an initiation identifier; and
    a secondary mobile communication device including a secondary transceiver, a secondary electronic processor electrically coupled to the secondary transceiver, and a secondary memory electrically coupled to the secondary electronic processor, the secondary electronic processor configured to
        receive one or more facility identifiers, each of the one or more facility identifiers associated with a facility,
        write the one or more facility identifiers to the secondary memory,
        decode the group call to determine the initiation identifier,
        compare the initiation identifier to the one or more facility identifiers, and
        join the group call based on the comparison between the initiation identifier to the one or more facility identifiers.

9. The system of claim 8, wherein the secondary electronic processor is further configured to leave the group call.

10. The system of claim 8, wherein the secondary electronic processor if configured to leave the group call by at least one selected from the group consisting of disabling one or more of the one or more facility identifiers and leaving a proximity area of the facility.

11. The system of claim 8, wherein one or more of the one or more facility identifiers are associated with at least one selected from the group consisting of a building, a street light, a utility pole, an advertising structure, a vehicle, and an indoor facility.

12. The system of claim 8, wherein the one or more facility identifiers are received from at least one selected from the group consisting of a call controller, a second mobile communication device, and a facility.

13. The system of claim 8, wherein the secondary electronic processor is configured to join the group call by performing at least one selected from the group consisting of enabling communication and unmuting the group call.

14. The system of claim 8, wherein the secondary electronic processor is configured to disable a facility identifier based on a predefined validation rule.

15. The system of claim 14, wherein the predefined validation rule comprises at least one selected from the group consisting of a distance and a time.

16. A mobile communication device comprising:
a transceiver;
a memory; and
an electronic processor electrically coupled to the transceiver and the memory, the electronic processor configured to
receive one or more facility identifiers, each of the one or more facility identifiers associated with a facility,
write the one or more facility identifiers to the memory,
decode a group call having an initiation identifier,
compare the initiation identifier to the one or more facility identifiers, and
join the group call based on the comparison between the initiation identifier to the one or more facility identifiers.

17. The mobile communication device of claim 16, wherein one or more of the one or more facility identifiers are associated with at least one selected from the group consisting of a building, a street light, a utility pole, an advertising structure, a vehicle, and an indoor facility.

18. The mobile communication device of claim 16, wherein the one or more facility identifiers or the group call is received from at least one selected from the group consisting of a call controller, a second mobile communication device, and a facility.

19. The mobile communication device of claim 16, wherein the electronic processor is configured to join the group call by performing at least one selected from the group consisting of enabling communication and unmuting the group call.

20. The mobile communication device of claim 16, wherein the electronic processor is configured to disable a facility identifier based on a predefined validation rule.

* * * * *